United States Patent [19]

Levey, Sr., deceased

[11] E Patent Number: Re. 33,446

[45] Reissued Date of Patent: Nov. 20, 1990

[54] DETONATING CORD TRANSPORT SYSTEM

[75] Inventor: David V. Levey, Sr., deceased, late of Joshua, both of Tex., by Julia Margaret Levey, executrix

[73] Assignee: Pengo Industries, Inc., Fort Worth, Tex.

[21] Appl. No.: 148,661

[22] Filed: Jan. 26, 1988

Related U.S. Patent Documents

Reissue of:

[64] Patent No.: 4,586,602
Issued: May 6, 1986
Appl. No.: 692,896
Filed: Jan. 18, 1985

[51] Int. Cl.[5] ..... B65D 81/02; B65D 85/30; B65D 85/62

[52] U.S. Cl. ..... 206/3; 206/495; 206/591; 206/499; 220/441; 102/293

[58] Field of Search ..... 206/3, 495, 591, 499; 220/441

[56] References Cited

U.S. PATENT DOCUMENTS

| | | | |
|---|---|---|---|
| 1,843,038 | 1/1932 | McIlvain | 220/441 |
| 1,930,680 | 10/1933 | Hinton | 220/441 |
| 2,208,873 | 7/1940 | Rosenberg | 206/495 |
| 2,601,919 | 7/1952 | Darbyshire | 206/3 |
| 4,055,247 | 10/1977 | Benedick et al. | 206/591 |
| 4,286,708 | 9/1981 | Porzel | 206/3 |

*Primary Examiner*—William I. Price
*Attorney, Agent, or Firm*—Arthur F. Zobal

[57] ABSTRACT

A detonating cord transport package wherein detonating cord is installed on a plurality of separator-support members so as to provide crossover locations at frequent intervals at which crossover locations there is incorporated means for stopping any detonation that occurs, with the result that such detonation will be confined to a relatively short length of detonating cord and will also be confined to the container in which the detonating cord transport package is disposed.

37 Claims, 2 Drawing Sheets

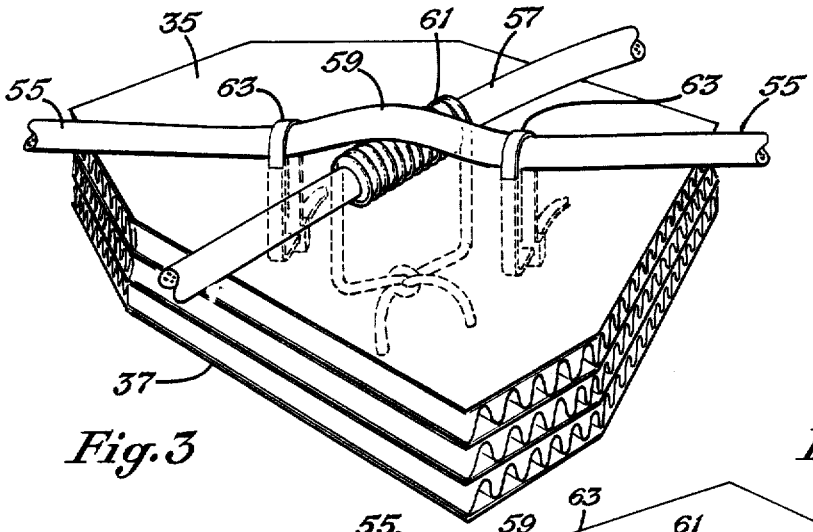
Fig. 3
Fig. 4
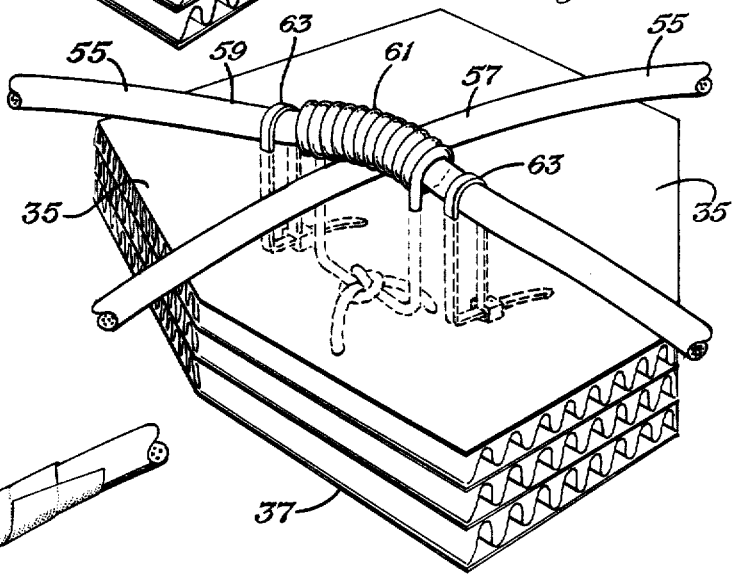
Fig. 5
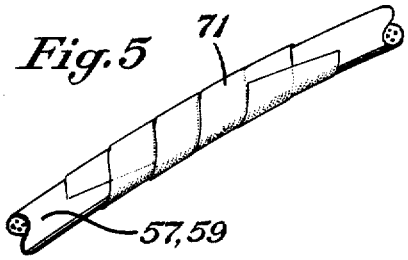
Fig. 6
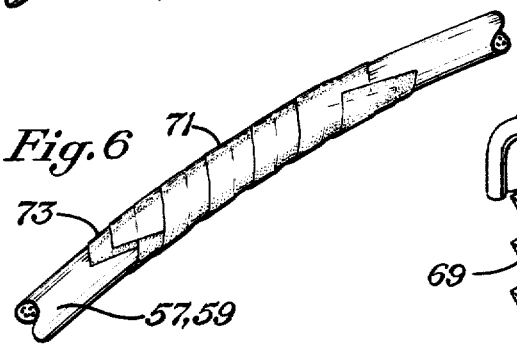
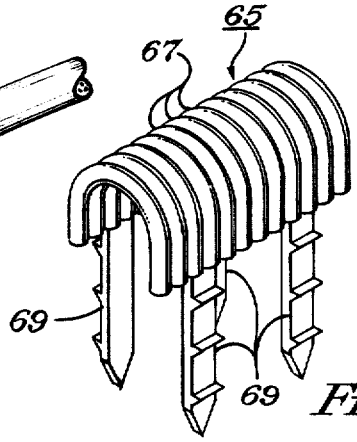
Fig. 7

DETONATING CORD TRANSPORT SYSTEM

Matter enclosed in heavy brackets [ ] appears in the original patent but forms no part of this reissue specification; matter printed in italics indicates the additions made by reissue.

FIELD OF INVENTION

The invention relates to the transporting of detonating cord and more particularly to systems for use in the packaging of detonating cord for transport.

BACKGROUND OF THE INVENTION

Detonating cord is used extensively in the petroleum exploration and production industry to initiate the detonation of explosive materials in various types of downhole tools, such as perforating tools, setting tools, and the like. The bore hole sites at which such tools and associated detonating cords used are scattered world wide, as are the relevant manufacturing, supply and service facilities. Consequently it is highly desirable that such tools, as well as the associated detonating cord be shipped by air from the supply facility location to the location of the using facility. However, the regulations governing the shipment of explosive materials by air are quite stringent. Basically, the regulations require that the explosive materials be packaged such that any ignition or detonation in one shipping container shall be confined to that container and will not propagate to another container.

It is the objective of the present invention to provide advantageous systems for packaging detonating cord in containers in such manner is to qualify for shipment by commercial air carriers in the United States of America and internationally.

SUMMARY OF THE INVENTION

The present invention provides advantageous systems for packaging detonating cord in containers in such manner as to qualify for shipment by commercial air carriers in the United States of America and internationally.

A continuous length of detonating cord to be transported is installed on a requisite number of separator-support members in such manner that at frequent intervals a second detonating cord portion passes over a first detonating cord portion on a front face surface of the separator-support member (these are referred to herein as "crossover locations"). At each crossover location severing means is interposed between the first and second detonating cord portions and retainer means is provided for maintaining the severing means in abutting relation with respect to the detonating cord portions and against movement away from the front face surface. A separator-support member with detonator cord installed is referred to herein as a "transport package section". The sections are stacked with a baffle member interposed between adjacent sections to make up a detonating cord transport package. The transport package is then placed, together with side and end baffle members, into a suitable container. The crossover locations function to stop any detonation that encounters them. Thus, a detonation of the detonating cord initiated at any location on or within a detonating cord transport package will, of course, travel in opposite directions from the ignition point, but will be stopped by the first crossover location encountered in both directions. The total detonation that can occur is insufficient to result in propogation from one container to another.

The mechanism of what occurs when a detonation encounters a crossover location is not fully understood, but the observed result is that both detonating cord portions are severed and the detonation is stopped. A severing means that has worked well in actual practice is monofilament Nylon cord wrapped on one of the detonating cord portions. Other thermoplastic materials and configurations may be used as is hereinafter explained. With some types of detonating cord it is desireable to reinforce the detonating cord as is hereinafter explained.

BRIEF DESCRIPTION OF DRAWINGS

FIG. 3 is a fragmentary isometric view showing details of a typical detonating cord crossover location of FIG. 2.

FIG. 4 is a fragmentary isometric view showing details of a detonating cord crossover location in accordance with another embodiment of the invention.

FIG. 5 is a fragmentary isometric view showing a detonating cord portion that is reinforced with thermoplastic tape in accordance with another embodiment of the invention.

FIG. 6 is a fragmentary isometric view showing a detonating cord portion that is reinforced with a plurality of layers of thermoplastic tape in accordance with a further embodiment of the invention.

FIG. 7 is an isometric view showing an alternate form of detonating cord severing means.

DESCRIPTION OF THE PREFERRED EMBODIMENTS

Figure 1:
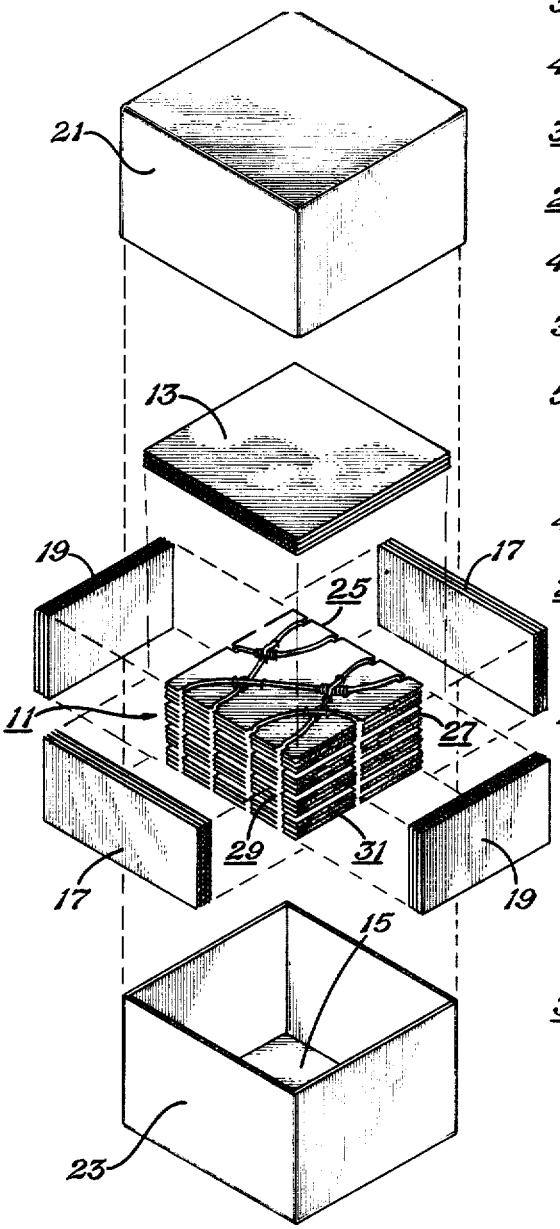
FIG. 1 is an exploded isometric view showing detonating cord packaged in accordance with a preferred embodiment of the invention.

A detonating cord transport package 11 in accordance with a preferred embodiment of the invention is shown in FIG. 1 of the drawings. The detonating cord transport package 11 is surrounded by top, bottom, side and end baffle members 13, 15, 17, 19 respectively, and placed in a telescoping type container having inner and outer parts 21, 23.

Figure 2:
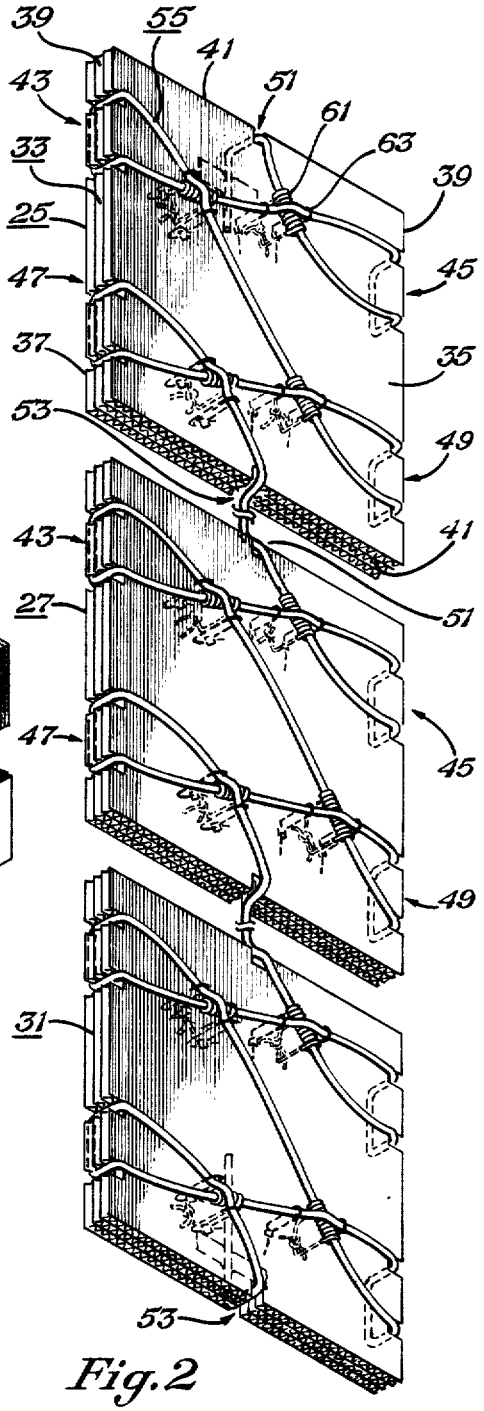
FIG. 2 is an isometric view showing a plurality of the individual sections of a detonating cord transport package in accordance with a preferred embodiment of the invention.

The detonating cord package 11 is made up of a plurality of sections 25, 27, 29, 31. As shown in FIG. 2, each transport package section comprises a separator-support member 33 having a front face surface 35, a back face surface 37, side edge surfaces 39 and end edge surfaces 41. Opposite side edge surfaces 39 are provided first and second pairs of oppositely disposed slots 43, 45 and third and fourth pairs of oppositely disposed slots 47, 49. The slot pairs are centered at approximately one-fourth of the length of the side edge surfaces 39. Opposite end edge surfaces 41 are provided with first and second end edge slots 51, 53 which are centered on the end edge surfaces 41.

A continuous length of the detonating cord 55 to be packaged is installed on the separator-support member 33 of the transport package section 25, traversing portions of the separator-support member surfaces such that there are a plurality of crossover locations on the front face surface 35 where a second detonating cord portion 59 crosses over a first detonating cord portion 57. To describe the detonating cord installation of the embodiment shown by FIG. 2, it will be convenient to refer to "upper" and "lower" with reference to the orientation of FIG. 2 on the drawing sheet. An end portion of the detonating cord 55 is secured as by tape as shown to the top back face surface 37 of the separator-support member 33 of the transport package section 25. The detonating cord then traverses the back face surface 37 to the first end edge slot 51 and via slot 51 to the front face surface 35 and then to the lower slot of the second pair 45, via that slot to the back face surface 37 and then to the upper slot of the second pair 45 and via that slot to the front face surface 35 and then over the detonating cord at a first crossover location and on to the lower slot of the first pair 43 and via that slot to the back face surface 37 and then to the upper slot of the first pair 43 and via that slot to the front face surface 35 and then over the detonating cord at a second crossover location and on to the lower slot of the third pair 49 and via that slot to the back face surface 37 and then to the upper slot of the third pair 49 and via that slot to the front face surface 35 and then over the detonating cord at a third crossover location and on to the lower slot of the fourth pair 47 and via that slot to the back face surface 37 and then to the upper slot of the fourth pair 47 and via that slot to the front face surface 35 and then over the detonating cord at a fourth crossover location and on to the second edge slot 53. To make up a plurality of transport package sections 25, 27, 29, 31 for assembly into a detonating cord transport package 11, the requisite number of separator-support members 33 are placed end to end as shown in FIG. 2, with adjacent end edge surfaces 41 being spaced apart a distance slightly greater than the thickness of the separator-support members 33. Then the continuous length of detonating cord is traversed from the front face surface end of the second edge slot 53 to the upper face end of the first edge slot 51 of the adjacent separator-support member of transport package section 27 and then to the lower slot of the second pair 45 and so on in the same traversing pattern just described for the transport package section 25, and so on, to the transport package section 29 (not shown in FIG. 2) and so on to the transport package section 31. When the detonating cord reaches the front face surface end of the second end edge slot 53 of transport package section 31, it traverses that slot to the back face surface 37 and then traverses the back face surface 37 a short distance where it is severed and the end portion secured to the desk face surface 37, as by tape as shown.

As the detonating cord 55 is being installed in the embodiment shown by FIG. 2 the first detonating cord portion 57 at each crossover location is wrapped with severing means in the form of cord 61, which cord is then secured to the separator-support member 33. Also, at each crossover location retainer means, such as pull-ties 63 are installed. When the continuous length of detonating cord of a desired total length has been installed on the requisite number of separator-support members 33 (for example, four) as above described with reference to FIG. 2, then the first transport package section 25 is rotated 180° and placed on top of the second transport package section 27 and then those two are rotated 180° and placed on top of the third transport package section 29 and then those three are rotated 180° and placed on top of the fourth transport package section 31. A buffer member (not shown) which is of the same length and width as the separator-support members and having end edge slots but not side edge slots, is inserted between adjacent separator-support members. The result is the detonating cord transport package 11 shown in FIG. 1.

Details of a typical crossover location of FIG. 2 are shown in FIG. 3, wherein severing means in the form of a cord 61 is wrapped onto the first detonating cord portion 57 with contiguous turns that extend beyond the sides of the second detonating cord portion 59. The severing means cord 61 is secured to the separator-support member 33 by passing its end portions through openings (not shown) to the back face surface 37 and tying them together. Retainer means in the form of pull-ties 63 are disposed on both sides of and adjacent the first detonating cord portion 57 so as to maintain the severing means cord 61 in abutting relation with respect to the detonating cord first and second portions 57, 59 and restrain the detonating cord first and second portions against movement away from the separator-support member front face surface 35. The pull-ties 63 bear on the second detonating cord portion 63 and extend through openings (not shown) in the separator-support member to its back face surface 37 where the free end portion engaged the one-way slip-latch portion and is drawn up tight.

Details of a typical crossover location in accordance with another embodiment of the invention are shown in FIG. 4. The crossover location of FIG. 4 is the same in all respects to that of FIG. 3 except that the severing means cord 61 is wrapped onto the second detonating cord portion 59 instead of onto the first detonating cord portion 57.

In accordance with another embodiment of the invention as shown, for example, in FIG. 7, the severing means may be in the form of contiguous ribs adapted for at least partially encompassing one of the detonating cord portions at a crossover location and extending beyond the sides of the other of the detonating cord portions. In the embodiment shown by FIG. 7, the length of a severing means clamp device 65 is made up of contiguously disposed ribs 67. Each rib 67 has a cord-like cross-section shape and adjacent ribs are integrally joined. The ribs 67 are generally in the shape of an inverted "U" dimensioned to be generally matingly received by detonating cord. The severing means clamp device 65 is provided with clamping legs 69 which are adapted for extending into a separator-support member 33 and clamping thereon. The severing means clamp device may be used on a first detonating cord portion 57 instead of severing means cord 61.

In accordance with some embodiments of the invention the detonating cord portion that is either wrapped with severing means cord 61 or at least partially encompassed by severing means contiguous ribs 67 is reinforced with thermoplastic reinforcing material. In other embodiments both detonating cord portions at the crossover locations are reinforced with thermoplastic material. In some embodiments the reinforcing material may take the form of a single layer of spirally wrapped tape 71 as shown by FIG. 5. In other embodiments the reinforcing material may take the form of a plurality of layers of spirally wrapped tape 71, 73 as shown by FIG. 6.

The purpose of the detonating cord transport package of the present invention is to accomplish the objective that any ignition or detonation of the detonating cord that is initiated anywhere within the detonating cord transport package (when the package is installed in a container as described herein with reference to FIG. 1) shall be confined within the detonating cord transport package container and will not propagate to another container. The operation of the detonating cord transport package of the present invention is that a detonation of the detonating cord initiated at any location on or within the detonating cord transport package will of course travel in opposite directions from the ignition point, but will be stopped by the first crossover location encountered in both directions.

In the embodiment shown by FIG. 2 the separator-support members 33 may typically be of such size (about one foot square) as to accomodate about six feet of detonating cord, so that a detonating transport package 11 made up of four sections would accomodate about twenty-five feet of detonating cord. With such an arrangement the maximum length of detonating cord that would be detonated as a result of an ignition would be about one foot for a transport package section. This would occur when the ignition point is on a loop of detonating cord extending from a crossover location to a slot pair and back to the crossover location, with each such loop being about one foot in length. The buffer members hereinbefore mentioned prevent such detonation from progressing to adjacent transport package sections. The total detonation that can occur as a result of an ignition in the detonating cord transport package of the present invention is insufficient to result in propagation from one container to another.

Whether or not reinforcing material should be used, and when used, and the number of layers preferred, will depend on the type of detonating cord that is being packaged. The following tabulation gives the preferred reinforcing for various types of detonating cord:

| Detonating Cord Type | Reinforcing Preferred |
|---|---|
| 80 GR (grains) per foot RDX Nylon Sheathed | None |
| 40 GR per foot RDX Nylon Round | 2 layers |
| 40 GR per foot RDX Nylon Ribbon | 3 layers |
| 70 GR per foot HMX TPR | 3 layers |
| 70 GR per foot HMX Silicone | 3 layers |
| 60 GR per foot PETN Plastic | 5 layers |

The reinforcing needed for types of detonating cord not listed can be readily determined by appropriate testing. When reinforcing material is used, it is preferred that both detonating cord portions be reinforced and it is essential that at least one detonating cord portion, which is preferably the one that is wrapped with severing means cord or at least partially encompassed by severing means contiguous ribs, be reinforced.

It has been found in practice that a satisfactory reinforcing material is Teflon tape that is one-half inches wide and is spirally wrapped with each tape turn advancing about one-half the tape width. A satisfactory Teflon tape is that designated HM 430 and available from CHR Industries, Inc. of New Haven, Conn. The function of the reinforcing material is to cause a slowing of the detonation rate at the crossover location to increase the effectiveness of the detonating cord severing action.

It has been found in practice that a satisfactory severing means material is 0.065 inch diameter monofilament Nylon cord. It is believed that thermoplastic material such as Delrin or Orlon could be used for severing means cord or contiguous ribs. Other thermoplastic material such as ABS, polyethylene, polypropylene and polybutylene may also work.

It has been found in practice that retainer means in the form of Vantex LTS 4 pull-ties is satisfactory. Other thermoplastic or non-metallic materials having requisite strength and configured to perform the requisite restraining action could be used.

It has been found in practice that the separator-support members can be layers of cardboard. In the embodiment shown, three layers of about one-fourth inch thick corrugated cardboard are used. Other non-metallic materials capable of performing the requisite function could of course also be used.

The foregoing disclosure and the showings made in the drawings are merely illustrative of the principles of this invention and are not to be interpreted in a limiting sense.

I claim:

1. A detonating cord transport package comprising a plurality of sections, with each section comprising:

a. a detonating cord separator-support member having front and back face surfaces and edge surfaces;

b. a continuous length of detonating cord disposed for support on said separator-support member and traversing portions of said surfaces such that there are a plurality of crossover locations on said front face surface where a second detonating cord portion crosses over a first detonating cord portion;

c. severing means interposed between said first and second detonating cord portions at each of said crossover locations; and, d. retainer means maintaining said severing means in abutting relation with respect to said detonating cord first and second portions and restraining said detonating cord first and second portions against movement away from said front face surface.

2. The device as in claim 1 wherein said severing means is a thermoplastic material.

3. The device as in claim 2 wherein said thermoplastic material is Nylon.

4. The device as in claim 2 wherein said severing means is in the form of cord wrapped onto one of said detonating cord portions with contiguous turns extending beyond the sides of the other of said detonating cord portions.

5. The device as in claim 3 wherein said severing means is in the form of cord wrapped onto one of said detonating cord portions with contiguous turns extending beyond the sides of the other of said detonating cord portions.

6. The device as in claim 2 wherein said severing means is in the form of contiguous ribs at least partially encompassing one of said detonating cord portions and extending beyond the sides of the other of said detonating cord portions.

7. The device as in claim 3 wherein said severing means is in the form of contiguous ribs at least partially encompassing one of said detonating cord portions and extending beyond the sides of the other of said detonating cord portions.

8. The device as in claim 4 wherein said one detonating cord portion is reinforced by thermoplastic reinforcing material prior to being wrapped with said severing means cord.

9. The device of claim 8 wherein said thermoplastic reinforcing material is in the form of one or more layers of spirally wrapped tape.

10. The device of claim 8 wherein said thermoplastic reinforcing material is Teflon.

11. The device of claim 9 wherein said reinforcing material is Teflon.

12. The device as in claim 4 wherein said detonating cord portions are reinforced by thermoplastic reinforcing material.

13. The device of claim 12 wherein said thermoplastic reinforcing material is in the form of one or more layers of spirally wrapped tape.

14. The device of claim 12 wherein said thermoplastic reinforcing material is Teflon.

15. The device of claim 13 wherein said reinforcing material is Teflon.

16. The device of claim 6 wherein said one detonating cord portion is reinforced by thermoplastic reinforcing material prior to being at least partially encompassed by said severing means contiguous ribs.

17. The device of claim 16 wherein said thermoplastic reinforcing material is in the form of one or more layers of spirally wrapped tape.

18. The device of claim 16 wherein said thermoplastic reinforcing material is Teflon.

19. The device of claim 17 wherein said thermoplastic reinforcing material is Teflon.

20. The device of claim 6 wherein said detonating cord portions are reinforced by thermoplastic reinforcing material.

21. The device of claim 20 wherein said thermoplastic reinforcing material is in the form of one or more layers of spirally wrapped tape.

22. The device of claim 20 wherein said thermoplastic reinforcing material is Teflon.

23. The device of claim 21 wherein said thermoplastic reinforcing material is Teflon.

24. The device as in any one of claims 4, 5, 8–15 wherein said severing means cord is wrapped onto said first detonating cord portion.

25. The device as in any one of claims 4, 5, 8–15 wherein said severing means cord is wrapped onto said second detonating cord portion.

26. The device as in any one of claims 6, 7, 16–19 wherein said severing means contiguous ribs at least partially encompass said first detonating cord portion.

27. The device as in any one of claims 6, 7, 16–19 wherein said severing means contiguous ribs at least partially encompass said second detonating cord portion.

*28. A detonating cord transport package comprising a plurality of sections, with each section comprising:*

*a detonating cord separator-support member having front and back face surfaces and edge surfaces,*

*a continuous length of detonating cord disposed for support on said separator-support member and traversing portions of said surfaces such that there are a plurality of locations on said front face surface where a second detonating cord portion is in close proximity to a first detonating cord portion, and*

*severing means interposed between said first and second detonating cord portions at each of said locations.*

*29. The device of claim 28, comprising:*

*means at each of said locations for maintaining said severing means in a given position with respect to said detonating cord first and second portions and for restraining said detonating cord first and second portions against movement away from said severing means.*

*30. The device of claim 28, wherein:*

*said first and second detonating cord portions at each of said locations have ends which are connected together by a loop portion of said detonating cord.*

*31. The device of claim 29, wherein:*

*said first and second detonating cord portions at each of said locations have ends which are connected together by a loop portion of said detonating cord.*

*32. A detonating cord transport package comprising:*

*a plurality of separator-support members located in layers,*

*a continuous length of detonating cord disposed for support on said separator-support members,*

*each of said support members having at least on one side thereof a portion of said detonating cord which traverses said side such that there are a plurality of locations on said side where a second detonating cord portion is in close proximity to a first detonating cord portion, and*

*severing means interposed between said first and second detonating cord portions at each of said locations.*

*33. The device of claim 32, comprising:*

*means at each of said locations for maintaining said severing means in a given position with respect to said detonating cord first and second portions and for restraining said detonating cord first and second portions against movement away from said severing means.*

*34. The device of claim 32, wherein:*

*said first and second detonating cord portions at each of said locations on each of said support members have ends which are connected together by a loop portion of said detonating cord.*

*35. The device of claim 33, wherein:*

*said first and second detonating cord portions at each of said locations on each of said support members have ends which are connected together by a loop portion of said detonating cord.*

*36. A detonating cord transport package, comprising:*

*a plurality of support members located in layers,*

*each of said support members having at least one support side with all of said one support sides of said support members facing in the same direction,*

*a continuous length of detonating cord disposed for support on said support members,*

*said detonating cord being formed in a plurality of loops on each of said support members whereby each of said support members supports a plurality of said loops of detonating cord,*

*each of said loops of detonating cord having two end portions in close proximity to each other at a given location on said one support side of its supporting support member,*

*said given locations on said one support side of each of said support members being spaced from each other, and*

*severing means interposed between said two end portions of each of said loops of said detonating cord on said support side of each of said support members.*

*37. The device of claim 36, comprising:*

*means at each of said locations for maintaining said severing means in a given position with respect to said two end portions thereat and for restraining said two end portions against movement away from said severing means.*

* * * * *